Sept. 22, 1970      L. SARTORE ET AL      3,529,401
ELASTIC NETTING LOADER
Filed April 29, 1969      2 Sheets-Sheet 1
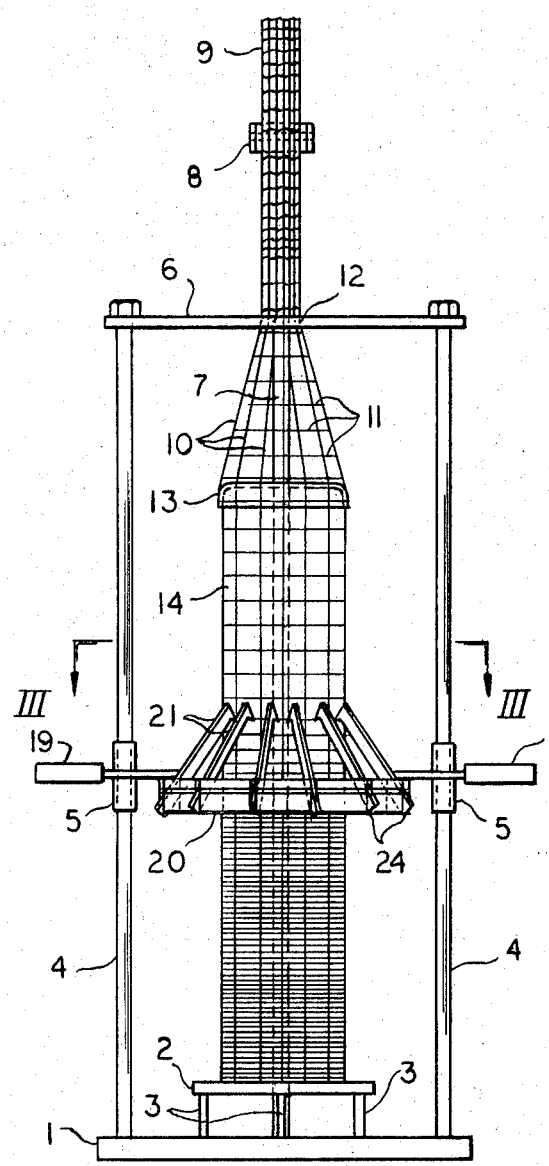
FIG. I
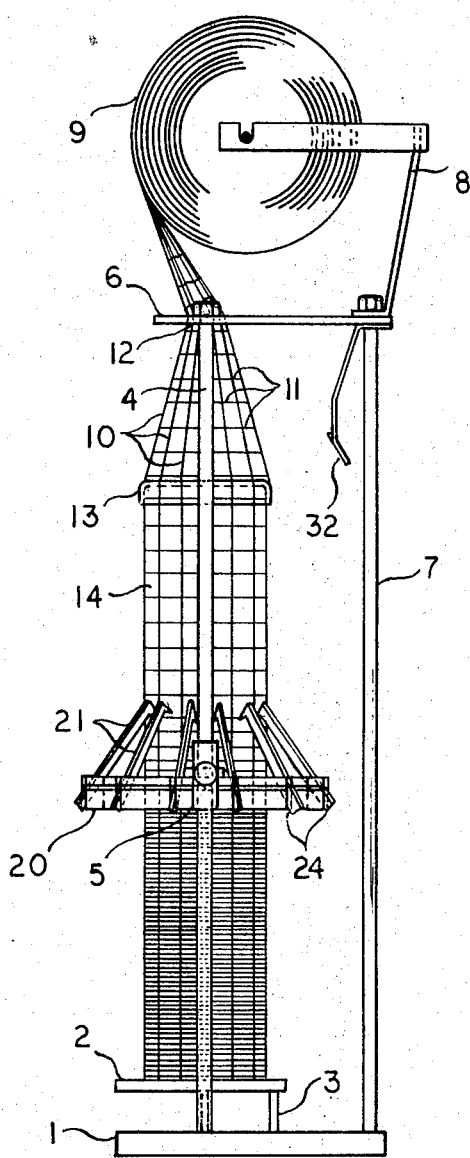
FIG. II
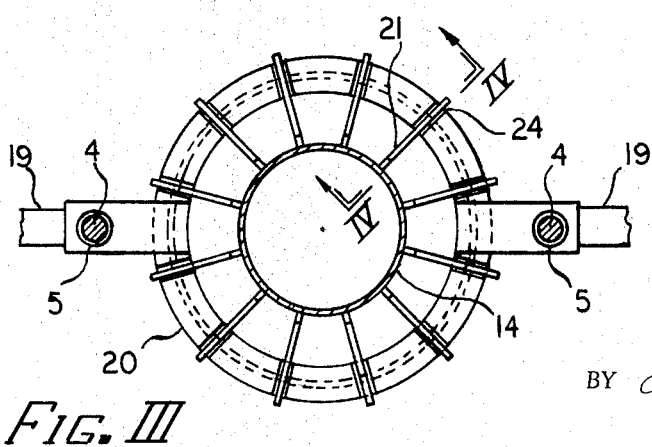
FIG. III
INVENTOR
LAURENCE SARTORE
& ANNITA SARTORE
BY Lloyd F. Engle, Jr.
ATTORNEY

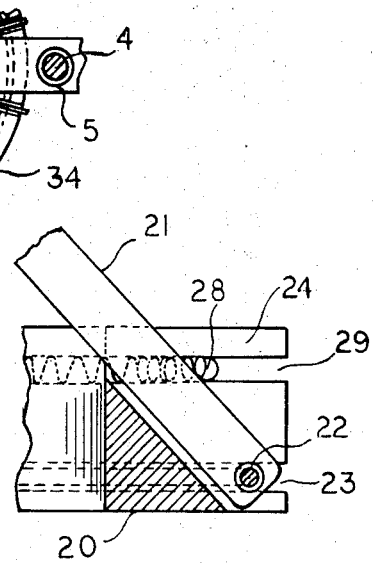
FIG. VIII
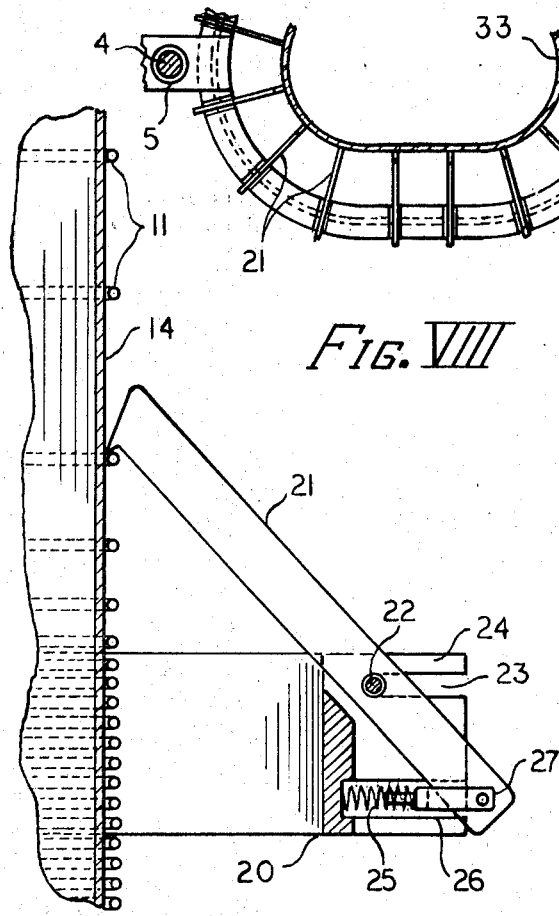
FIG. IV
FIG. V
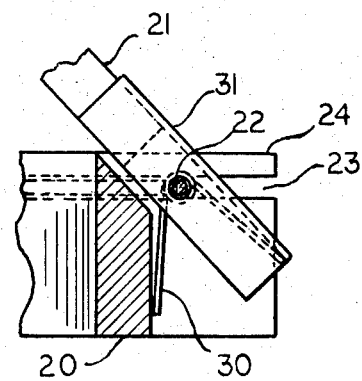
FIG. VI
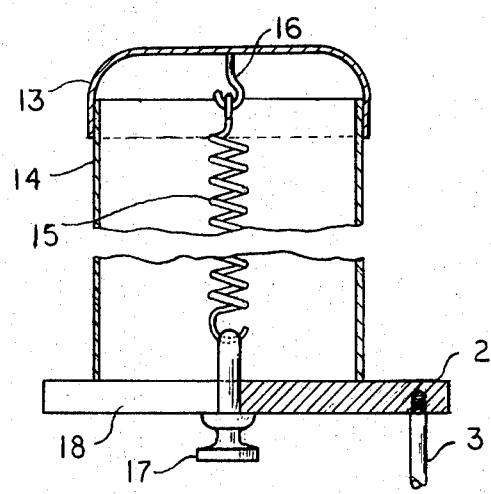
FIG. VII United States Patent Office 3,529,401
Patented Sept. 22, 1970

1

3,529,401
ELASTIC NETTING LOADER
Laurence Sartore and Annita Sartore, Pleasant Hills, Pa.
(both of 104 Temona Drive, Pittsburgh, Pa. 15236)
Filed Apr. 29, 1969, Ser. No. 820,209
Int. Cl. A22c 11/02; B65b 67/00
U.S. Cl. 53—197                                    8 Claims

ABSTRACT OF THE DISCLOSURE

A loader for tubular elastic netting having a platform with an upstanding base on which a stuffing horn for meat is positioned vertically to receive the netting which is pulled downward onto the horn over a cap on the upwardly disposed end of the horn from a roll of netting rotatably mounted above the horn. A loading head in uniform outwardly spaced relation with the horn is mounted in slidable engagement on vertical guide means which are laterally disposed outside of the horn and loading head and position the loading head in outwardly disposed non-engaging relation to the horn. Net pulling means are mounted on the loading head and are spring loaded to exert an inward pressure against the horn. The inwardly disposed ends of the net pulling means are adapted to engage the circumferential strands of the netting on downward movement of the loading head and to slide over the circumferential strands on upward movement of the loading head.

Our invention relates to apparatus for loading tubular elastic netting onto a stuffing horn for use in the netting of meat, poultry and other food products.

In the prior art of netting meat and other food products, it has been a consistent problem to place the meat in the netting in such a way that the restraining force of the netting will be used effectively and in such a way that the netted product will be attractive to consumers. Subsequent to U. S. Pat. No. 1,505,218 issued to L. Sartore, one of the applicants herein, on Aug. 19, 1924, this problem was further complicated by the introduction of tubular elastic netting which was required to be stretched circumferentially to place it around the meat or poultry. This brought about the development of various apparati, in the nature of stuffing horns, such as that disclosed in U.S. Pat. No. 3,290,841 issued to M. A. Sartore on Dec. 13, 1966, which embodied a tapered expandable horn. In the meantime, the developing art in Europe and elsewhere in the world was tending toward the use of non-expandable tubes which were cylindrical or only slightly tapered.

In all of the prior art it has been required for the operator to predetermine the length of the piece of tubular netting to be used, cut the correct length, slide it over the discharge end of the horn and stuff the meat or poultry into it. Therefore, if the operator cut the piece of netting too short, the product would not be completely netted and, if the operator cut it too long, a portion of netting was wasted. In either event, the result was a poorly netted, unattractive product.

We have perceived that the art can be improved by loading a large quantity of netting on the stuffing horn or tube so that a piece of meat or poultry can be stuffed through the horn and withdraw the exact amount of netting needed, thereby permitting the operator to cut the netting beween the discharge end of the horn and the netted product. This produces a properly netted, attractive product and eliminates all opportunity for error of the operator in cutting the netting.

Briefly to describe one form of our invention, we provide an annulus having a plurality of spring loaded radial loading hooks pivotally mounted thereon. The said loading hooks are upwardly extending and converging to slidably engage the outside of the tubular stuffing horn which is mounted on a base and extends upwardly therefrom in inward concentric spaced relation with the said annulus which is positioned between and in slidable engagement with two guide rods oppositely disposed outwardly from the base, the stuffing horn and the annulus. The said guide rods are fixed to the platform which also supports the base and extend upwardly therefrom to the upper support plate which is disposed above the upwardly disposed end of the stuffing horn. The upper support plate has a bracket fixedly mounted thereon which rotatably engages the roll of netting and a feed hole in concentric relation with the stuffing horn to guide the netting downward into stretched circling engagement with the stuffing horn. We also provide a cap which slidably engages the upwardly disposed end of the stuffing horn and has a helical spring depending inwardly therefrom to attachment means slottedly engaging the base and exerting downward pressure on the cap, thereby holding it in fixed engagement with the stuffing horn and holding the stuffing horn in positioned engagement with the base.

One object of our invention is to provide an apparatus which enables the operator to load a large quantity of tubular elastic netting onto the stuffing horn in a short time. Another object of our invention is to save the time of the operator by eliminating the necessity for cutting and loading each piece of netting separately. A further object of our invention is to eliminate error of the operator in the cutting of the netting. Additional objects will appear from the specification and the claims.

Referring now to the drawings:

FIG. I is an elevational view looking at the front of our net loading apparatus as the operator would face it.

FIG. II is a side elevational view of our loader taken in the plane of line II—II of FIG. I.

FIG. III is a cross-sectional view taken in the plane of line III—III of FIG. I and showing our loading head in plan view.

FIG. IV is a cross-sectional view through one side of our annular loading head and the stuffing horn being loaded taken in the plane of section line IV—IV of FIG. III and showing one of the loading hooks engaging the netting.

FIG. V is a partial cross-sectional view through one side of our annular loading head showing a different arrangement for mounting and spring loading our loading hooks.

FIG. VI is a partial cross-sectional view through one side of our annular loading head showing another arrangement for mounting and spring loading our loading hooks.

FIG. VII is a partial cross-sectional view through the positioned stuffing horn and showing our cap and helical spring positioning means.

FIG. VIII is a partial cross-sectional view through one side of a different form of our stuffing horn and showing a partial plan view of the different form of our loading head used therewith.

The numeral 1 designates the platform having base 2 mounted thereabove on posts 3. Guide rods 4 rigidly engage the platform 1 and extend upward therefrom through slidable engagement with guide sleeves 5 and beyond to fixed engagement with the upper support plate 6. Support rod 7 is also in fixed engagement with the platform 1 and the support plate 6. The yoke type bracket 8 is fixedly mounted on the upper side of support plate 6 and rotatably supports the roll 9 of tubular elastic netting comprised in non-elastic longitudinal strands 10 and elastic circumferential strands 11. Guide hole 12 in support plate 6 positions the netting as it comes off of the roll 9 so that it will feed over the cap 13 and the stuffing horn 14. The cap 13 is held in place on the stuffing horn 14 and the entire assembly is held in place on base 2 by the helical spring 15 which engages the cap hook 16 and the knob 17. The knob 17 is positioned in slot 18 in base 2 by the operator when the assembly of cap 13 and horn 14 are placed on the base 2 preparatory to loading. Handles 19 are rigidly engaged to the guide sleeves 5 and the annulus 20 which surrounds the stuffing horn 14 in concentric spaced relation. The loading hooks 21 are pivotally mounted on the annulus 20 by the ring wire 22 which seats in annular slot 23 and thereby position the loading hooks 21 in radial slots 24. The upwardly disposed hook ends of the loading hooks 21 are inwardly depressed by spring loading. In FIG. IV the spring loading is provided by helical spring 25 seated in bore hole 26 and surrounding clevis pin 27 which pivotally engages loading hook 21. In FIG. V the spring loading is provided by annular helical spring 28 which inwardly contracts into annular slot 29 and slidably engages the loading hook 21. In FIG. VI the spring loading is provided by safety pin-type spring 30 which returns around ring wire 22 and seats inside the channel extension 31 which rigidly engages the loading hook 21 and pivotally engages ring wire 22. Anchor spring 32 is rigidly engaged to support plate 6 and depends therefrom in position to engage the outer periphery of the annular loading head 20 and hold same in upward suspended position when not in use. In FIG. VIII the numeral 33 indicates the oblong cross-sectioned horn which we use for netting the more irregular cuts of meat, such as standing rib roasts. The correspondingly oblong shaped loading head used therewith is designated by the numeral 34.

In beginning the loading operation, the operator places the annular loading head in the upward suspended position, places a roll of tubular elastic netting in the yoke bracket, places the cap on the stuffing horn with the helical spring and knob depending through the horn, and places the assembly of cap and horn in position on the base by pulling the knob below and sliding it into the slot in the base. The outside terminal end of the netting is fed downward through the guide hole in the upper support plate, through the opening within the inwardly disposed ends of the loading hooks and is expanded over the cap and the upwardly disposed end of the stuffing horn. Then the operator releases the anchor spring and lowers the loading head until the hook ends of the loading hooks pass over the cap and engage the circumferential strands of the tubular elastic netting. Thereafter, the operator merely operates the handles to oscillate the loading head downward and upward to compactly stack the netting on the stuffing horn. After the desired amount of netting has been loaded on the stuffing horn, the operator raises the loading head into suspended engagement with the anchor spring, cuts the netting above the tube if the roll has not been exhausted, removes the assembly of the cap and horn from the base, removes the cap from the horn and is ready to use the loaded horn in the stuffing apparatus.

Our loaded horn is connected to stuffing apparati in many different ways and, for this reason, we have devised a number of different designs for the downwardly disposed end of our horn. In one form the connecting end of our horn is merely a straight tube or slightly tapered forwardly from the connecting end and has no positive connecting features thereon. With this form, the operator merely slides the connecting end over the discharge end of a tapered stuffing horn, such as that shown and disclosed in U.S. Pat. No. 3,290,841 issued to M. A. Sartore, until it wedgedly engages thereon. In other forms we provide positive connecting features on the connecting end of our horn which are adapted to fixedly engage connecting means on meat receiving apparati. One such connecting feature is the well known L-shaped twist slot which is cut into the end of our horn at diametrically opposed positions and is adapted to engage pins outwardly projecting from a short tube section on the fixed portion of the stuffing apparatus, said short tube section having outside diameter slightly smaller than the inside diameter of our horn. Another such connecting feature is the well known bayonet lock which we have mounted at diametrically opposed positions on our horn and comprising a pin mounted on a leaf spring and designed to engage a corresponding hole in the other connecting part. This type may also be reversed with the bayonet locks on the short tube section and the corresponding holes in our horn. Still another such connecting feature comprises an outwardly extending flange on the connecting end of our horn which is adapted to slide into a semi-annular slot provided on the fixed portion of the stuffing apparatus. A further adaptation of the next preceding connecting feature comprises the provision of the well known key-hole twist slots at diametrically opposed points on the said flange adapted to fit on nail-head type pins provided on the fixed portion of the stuffing apparatus. In the various instances of the foregoing types of connecting means we have provided matching connecting means on our base to which our stuffing horn is attached during the loading operation.

It is important to understand that the spring loading force which we apply to our loading hooks must be within a certain range in order for the apparatus to function properly and efficiently. In other words, if the pressure of the hook against the stuffing horn being loaded is too little, the hook may not properly engage the circumferential strands of netting for application of the net pulling force and, if the pressure is too great, the hook may push the netting upward on the upward stroke of the loading head and even score the stuffing horn. We have found, when measured at the hook tip, that this pressure should be of a magnitude of from (2) ounces to sixteen (16) ounces to assure efficient performance of our apparatus.

It will be understood that the operator will control the amount of netting which will be loaded onto the stuffing horn in the operation of our apparatus. Depending upon the degree of compaction, it is quite possible and feasible to load twenty (20) to thirty (30) yards of netting onto the horn, with the use of our apparatus, in a very short period of time, in the nature of one (1) or two (2) minutes.

We claim as our invention:

1. An apparatus for loading tubular elastic netting on a meat stuffing horn comprising a platform, horn support means rigidly mounted on said platform and adapted to fixedly position the said horn vertically, loading head guidedly mounted in outwardly disposed uniform spaced relation to the said horn, a plurality of net pulling means pivotally mounted on the said loading head adapted to engage the netting and carrying it downwardly over the outer surface of the said horn on downward movement of said loading head and slidably return over the outside of the netting on upward movement of said loading head, spring loading means engaging the said net pulling means and adapted to rotate the upwardly disposed ends of said net pulling means into slidable engagement with the said horn, guide means adapted to slidably engage the said loading head and being fixedly engaged to the said platform and extending upwardly therefrom in parallel spaced relation to the longitudinal axis of said horn, a support plate rigidly engaging the upwardly disposed ends of said guide means at a plane above the upwardly disposed end of said horn, and a netting roll support means adapted to rotatably support a roll of tubular elastic netting above the upwardly disposed end of said horn.

2. An apparatus for loading tubular elastic netting according to claim 1 wherein a cap is slidably engaged over the upwardly disposed end of the said horn, said cap having upwardly disposed inwardly arcuating circumferential edges.

3. An apparatus for loading tubular elastic netting according to claim 1 wherein each net pulling means is comprised in a rigid strip of metal having a downwardly arcuating hook at its most inwardly disposed tip.

4. An apparatus for loading tubular elastic netting according to claim 1 wherein the spring loading means is comprised in an annular helical spring under tension slidably engaging the outwardly disposed edges of the net pulling means in a plane upwardly disposed from their pivotal mounting.

5. An apparatus for loading tubular elastic netting according to claim 1 wherein the spring loading means is comprised in the combination of a helical spring under compression seated in a radially outward opening bore hole in the loading head, and a clevis pin pivotally engaging each net pulling means at a point downwardly disposed from the pivotal mounting of said net pulling means and cooperating with the outwardly disposed end of said helical spring.

6. An apparatus for loading tubular elastic netting according to claim 1 wherein the downwardly disposed portion of the net pulling means is comprised in an inwardly opening channel pivotally mounted on the loading head and the spring loading means is comprised in a safety-pin type spring returning around the said pivotal mounting and having one free end inwardly seating against the loading head and the other free end outwardly seating against the inwardly disposed base of the said channel.

7. An apparatus for loading tubular elastic netting according to claim 1 wherein the guide means are comprised in two rods oppositely disposed outside the said loading head in parallel spaced relation with the longitudinal axis of the horn and slidably inwardly engaging tubular sleeves rigidly fixed to said loading head.

8. An apparatus for loading tubular elastic netting according to claim 1 wherein a guide hole is provided in the support plate in concentric relation with the said horn to receive the netting downwardly depending from the said netting roll.

References Cited

UNITED STATES PATENTS

| | | | |
|---|---|---|---|
| 1,256,570 | 2/1918 | Johnston | 26—56 |
| 1,761,189 | 6/1930 | Brennan et al. | 17—42 |
| 3,412,523 | 11/1968 | Raymond et al. | 53—197 |

THERON E. CONDON, Primary Examiner

N. ABRAMS, Assistant Examiner

U.S. Cl. X.R.

17—42; 53—390